United States Patent [19]

Emmons

[11] 4,210,565
[45] Jul. 1, 1980

[54] AMBIENT OR LOW-TEMPERATURE CURABLE COATINGS

[75] Inventor: William D. Emmons, Huntingdon Valley, Pa.

[73] Assignee: Rohm and Haas Company, Philadelphia, Pa.

[21] Appl. No.: 9,023

[22] Filed: Feb. 2, 1979

[51] Int. Cl.$^2$ .................... C08F 216/34; C08F 16/34; C08F 20/02
[52] U.S. Cl. .................... 260/29.6 TA; 525/376; 525/194; 525/329; 525/220; 526/315; 526/317; 526/321; 427/393.5; 427/388.3; 427/388.4; 427/393; 428/500; 428/507; 428/516; 428/524; 428/528
[58] Field of Search ................ 260/29.6 TA; 427/389, 427/388 C, 388 B, 385 R, 385 B, 393; 526/317, 315, 321; 428/500, 507, 516, 524, 528; 525/194, 220, 329, 376

[56] References Cited

U.S. PATENT DOCUMENTS

| | | | |
|---|---|---|---|
| 3,025,265 | 3/1962 | Maeder | 526/51 X |
| 3,513,125 | 5/1970 | Kehr | 260/29.2 N |
| 3,896,085 | 7/1975 | Larsson et al. | 260/29.6 TA |
| 4,016,127 | 4/1977 | Larsson et al. | 260/29.6 TA |

*Primary Examiner*—Michael R. Lusignan
*Attorney, Agent, or Firm*—Lester E. Johnson; Robert J. Steinmeyer; John E. Vanderburgh

[57] ABSTRACT

Ambient or low-temperature curable solutions or aqueous dispersions of (1) a polymer containing units polymerized from a monomer mixture of (a) from about 0.25% to about 30% by weight of a polymerizable aldehyde, and (b) at least one copolymerizable monoethylenically unsaturated monomer, with (2) a curing agent selected from the group of dicarboxylic acid bis-hydrazides, dicarboxylic acid bis-hydrazones, and acrylic oligomers and low molecular weight acrylic solution polymers containing a plurality of pendant hydrazide or hydrazone groups. The solutions or dispersions are useful as general industrial coatings, maintenance coatings, furniture and appliance coatings, heavy transportation coatings, automobile refinishes and plastics coatings.

19 Claims, No Drawings

AMBIENT OR LOW-TEMPERATURE CURABLE COATINGS

CROSS-REFERENCE

This application is related to the commonly-assigned application of Bjorn E. Larsson and Fred A. Desiderio entitled AMBIENT OR LOW-TEMPERATURE CURABLE COATINGS FOR LEATHER AND OTHER FLEXIBLE SUBSTRATES filed on the same date as this application.

Field of the Invention

This invention relates to coating compositions containing a solution or aqueous dispersion of a polymer of polymerizable aldehydes, $\alpha,\beta$-unsaturated acids, and alkyl esters of methacrylic acid and acrylic acid and, as a curing agent therefore, dicarboxylic acid bis-hydrazides and bis-hydrazones, and acrylic oligomers and low molecular weight acrylic solution polymers containing a plurality of pendant hydrazide or hydrazone groups. The compositions are useful as general industrial coatings, maintenance coatings, furniture and appliance coatings, heavy transportation coatings, automobile refinishes and plastics coatings.

Description of the Prior Art

U.S. Pat. No. 3,513,125 discloses the use of various hydrazides to modify and/or crosslink various polymers including ketone and aldehyde polymers. Optimally, the chosen crosslinking agent in the chosen polymer system is completely non-reactive at the blending temperature and crosslinking is generally performed at 70° C. to 300° C. The compositions disclosed have varied uses, for example coatings for wood, metal, and paper; films; molded items; caulking compositions; adhesives and the like.

U.S. Pat. No. 3,025,265 discloses polymers containing hydrazide or hydrazone functional groups, prepared by the reaction of hydrazine with polymerized units of carboxylic acids, including acrylic acid and methacrylic acid and ester or acid chloride derivatives thereof, which are crosslinkable by reaction with a relatively small molecule containing aldehyde or ketone functional groups. Examples of the crosslinking aldehydes and ketones mentioned are acrolein and polyvinyl methyl ketone. The crosslinking reactions disclosed in the patent can be accelerated by heat.

U.S. Pat. No. 3,455,861 discloses the use of an aqueous dispersion of an acrolein-acrylonitrile-ethyl acrylate terpolymer mixed with crosslinking agents including phenol-, urea-, and melamine-formaldehyde resins and hydrazine to form an elastic coating on leather.

U.S. Pat. Nos. 4,016,127 and 3,896,085 disclose emulsion polymers containing (a) from about 0.25 to 4% by weight acrolein, (b) from about 0.5 to 10% by weight of an ethylenically unsaturated carboxylic acid, and (c) up to about 99.25% by weight alkyl acrylate, alkyl methacrylate, and mixtures thereof which are curable with ammonia, polyprimary amines, and hydrazine. The compositions of the patent are useful in treating leather and particularly in base cost leather treating compositions.

BACKGROUND OF THE INVENTION

Of the many ambient curable coatings available, those which are considered among the most useful and effective for general industrial coatings are the ambient cured aliphatic urethane coatings. However, these coatings are very expensive and are deficient in certain properties, and have not been accepted for broad use in industrial coatings. The aliphatic isocyanate residues in the coatings render them toxic, and they do not provide a durable exterior on metallics, which is a requirement in automobile refinishes. Thus, there is a need for an effective general industrial coating which is not costly, non-toxic and ambient or low-temperature curable.

SUMMARY OF THE INVENTION

It is an object of the present invention to provide ambient or low-temperature curable polymer coating compositions.

Another object is to provide improved crosslinked coatings carried on a rigid substrate.

A further object is to provide an article of manufacture comprising a rigid substrate coated with the improved crosslinked coating.

These and other objects as will become apparent are achieved by the present invention which comprises an ambient or low-temperature curable polymer composition adapted to coat a rigid substrate comprising:

a. a polymer polymerized from a monomer mixture comprising (1) from about 0.25% to about 35% by weight of a polymerizable aldehyde, and (2) the balance to 100% of at least one copolymerizable mono-ethylenically unsaturated monomer selected from the group consisting of $\alpha,\beta$-ethylenically unsaturated carboxylic acids, $(C_1-C_{24})$alkyl methacrylates, $(C_1-C_{24})$alkyl acrylates, vinylidene halides, vinyl halides, (meth)acrylonitrile, vinyl esters, ethylene and alpha-olefins, acrylic and methacrylic acid esters of alcohol-ethers, vinyl ethers, styrene and alkyl-substituted styrenes and vinyl aromatics the combination of monomers being selected to provide a $T_g$ of the polymer of greater than about 0° C.; and b. a curing agent comprising a member selected from the group consisting of a dicarboxylic acid bis-hydrazide represented by the formula, $H_2N-NH-C(O)-R-C(O)-NH-NH_2$, a dicarboxylic acid bis-hydrazone represented by the formula $R^1R^2C=N-NH-C(O)-R-C(O)-NH-N=CR^1R^2$, and acrylic oligomers and low molecular weight acrylic solution polymers containing a plurality of pendant hydrazide groups of the formula $-C(O)-NH-NH_2$ or hydrazone groups of the formula $-C(O)-NH-N=CR^1,R^2$, wherein R is a member selected from the group consisting of a divalent alkylene group or alicyclic group having from 0 to 34 carbon atoms and a divalent aromatic ring and $R^1$ and $R^2$ are selected from the group consisting of H and $(C_1-C_6)$ alkyl and alicyclic groups, the amount of bis-hydrazide or bis-hydrazone being selected to provide a ratio of hydrazide or of hydrazone groups to aldehyde groups of the polymer in the composition of from about 1:2 to 2:1.

In a preferred embodiment the polymer component of the composition of the invention comprises an aqueous emulsion polymer containing from about 30% to about 60% by weight resin solids polymerized from a monomer mixture comprising (1) from about 0.5% to about 10% by weight of a polymerizable aldehyde selected from the group consisting of acrolein and methacrolein, (2) from about 0.5% to about 10% by weight of an $\alpha,\beta$-ethylenically unsaturated carboxylic acid selected from the group consisting of acrylic acid and methacrylic acid, and (3) up to about 99% by weight of at least one copolymerizable monomer, the combination of monomers being selected to provide a $T_g$ of the polymer of from about $+10°$ C. to about $60°$ C.

In another preferred embodiment, the polymer component of the composition of the invention comprises an aqueous heteropolymer containing from about 30% to about 60% by weight resin solids, the particles of which comprise (a) about 50 parts to 85 parts by weight of a first polymer having a $T_g$ of greater than $0°$ C., preferably from about $+10°$ C. to about $60°$ C. formed by emulsion polymerization of a first monomer mixture comprising (1) from about 0.5% to about 10% by weight of a polymerizable aldehyde selected from the group consisting of methacrolein and acrolein, (2) from about 0.5% to about 10% by weight of at least one $\alpha,\beta$-ethylenically unsaturated carboxylic acid, and (3) up to about 99% by weight of at least one copolymerizable mono-ethylenically unsaturated monomer; and (b) about 15 parts of 50 parts by weight of a second polymer having a $T_g$ of about $60°$ C. to about $0°$ C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

In a more preferred embodiment of the invention, the polymer component of the composition of the invention comprises an aqueous emulsion polymer containing from about 30% to about 60% by weight resin solids polymerized from a monomer mixture comprising (1) from about 1% to about 7.5% by weight of acrolein, (2) from about 1% to about 7% by weight of a member selected from the group consisting of acrylic acid and methacrylic acid, and (3) up to about 98% by weight of at least one monomer selected from the group consisting of $(C_1-C_{24})$alkyl methacrylates and $(C_1-C_{24})$alkyl acrylates the combination of the alkyl methacrylates and alkyl acrylates being selected to provide a $T_g$ of the polymer of from about $+10°$ C. to about $60°$ C.

The polymerizable aldehyde used in the polymer component of the composition can be a member selected from the group consisting of acrolein methacrolein, vinylbenzaldehyde and crotonaldehyde and mixtures thereof. Acrolein and methacrolein are preferred. Acrolein is most preferred. A minor amount of the aldehyde component can be replaced with other polymerizable carbonyl compounds such as vinyl acetoacetate, allyl acetoacetate, methyl vinyl ketone, vinylbenzene methyl ketone, and acetoacetoxyethyl methacrylate Examples of the $\alpha,\beta$-ethylenically unsaturated acids which can be used in forming the polymers of the invention include acrylic acid, methacrylic acid, ethacrylic acid, itaconic acid, aconitic acid, crotonic acid, citraconic acid, maleic acid, fumaric acid, $\alpha$-chloroacrylic acid, cinnamic acid, mesaconic acid, and mixtures thereof. As indicated above, acrylic acid and methacrylic acid are preferred.

Examples of the $(C_1-C_{24})$alkyl groups of the esters of methacrylic acid and acrylic acid which can be used in forming the copolymers used in the invention include methyl, ethyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl, stearyl groups, and the like. In forming the random polymerized emulsion polymer and the first polymer of the emulsion heteropolymer used in the invention, a combination of butyl acrylate with methyl methacrylate in relative amounts selected to meet the $T_g$ requirements for the polymer is preferred.

While acrylates and methacrylates are preferred, other mono-ethylenically unsaturated polymerizable monomers useful in the invention are vinylidene halides, vinyl halides, (meth)acrylonitrile, vinyl esters such as vinyl formate, vinyl acetate and vinyl propionate, and mixtures of ethylene and such vinyl esters, alkyl methacrylic esters, acrylic and methacrylic acid esters of alcohol-ethers such as diethylene glycol monoethyl or monobutyl ether, styrene and alkyl substituted styrenes and vinyl aromatics, mixtures of ethylene with other alpha-olefins such as propylene, butylene, pentene, and the like, and combinations of ethylene with vinyl ethers such as methylvinyl ether, ethylvinyl ether, vinyl 2-methoxyethyl ether, vinyl 2-chloroethyl ether and the like.

The polymers of the invention can be prepared by conventional emulsion or solution polymerization techniques. The emulsifiers or dispersing agents employed for preparing the monomer emulsions or polymer emulsions may be of the anionic, cationic or nonionic type. Also a mixture of nonionic type with either anionic or cationic types may be used.

Suitable anionic dispersing agents include for example the higher fatty alcohol sulfates, such as sodium lauryl sulfate, and the like, alkylaryl sulfonates such as sodium or potassium isopropylbenzene sulfonates or isopropyl naphthalene sulfonates, and the like; alkali metal higher alkyl sulfosuccinates, such as, sodium octyl sulfosuccinate, sodium N-methyl, N-palmitoyltaurate, sodium oleyl isothionate and the like, and alkyl metal salts of alkylarylpolyethoxyethanol sulfates or sulfonates, such as sodium tert-octylphenoxypolyethoxyethyl sulfate having 1 to 5 oxyethylene units and the like.

Suitable cationic dispersion agents include laurylpyridinium chlorides, cetyldimethyl amine acetate, and alkyldimethylbenzylammonium chlorides in which the alkyl group has from 8 to 18 carbon atoms.

Suitable non-ionic dispersing agents include alkylphenoxypolyethoxyethanols having alkyl groups of from about 7 to about 18 carbon atoms and from about 6 to about 60 oxyethylene units such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analagous ethylene oxide condensates of long-chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecyl amine, hexadecyl amine, and octadecyl amine, containing from 6 to 60 oxyethylene units; block copolymers of ethylene oxide and propylene oxide comprising a hydrophobic propylene oxide section combined with one or more hydrophilic ethylene oxide sections.

The polymerizable emulsions can be prepared at a temperature in the range of from about 0° C. to about 100° C., but intermediate temperatures are generally preferred. Peroxidic free-radical catalysts and catalytic systems of the redox type can be used. A thermal peroxidic catalyst system is preferred. Redox systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides, such as t-butyl hydroperoxide and cumene hydroperoxide, and esters such as t-butyl perbenzoate. Other reducing agents include water soluble thiosulfates, hydrosulfites, tertiary amines, such as triethanolamine and the like, and salts of metals such as the sulfate salts of metals capable of existing in more than one valent state such as cobalt, iron, nickel, and copper.

The most convenient process of preparing the dispersions of polymers comprises agitating an aqueous suspension or emulsion of the mixture of copolymerizable monomers and redox catalytic combination at room temperature without the application of external heat. The amount of catalyst can vary but the usual range is from 0.01 to 3% of the peroxidic and the same or lower proportions of the reducing agent based on the weight of the monomer. In this way, it is possible to prepare dispersions which contain as little as 1% and as much as 60% or even more of the resinous polymers on a weight basis. It is more practical and preferred to produce dispersions which contain from about 30% to about 50% resin solids.

If desired, a chain-transfer agent can be used to moderate the molecular weight of the polymer obtained by the emulsion polymerization procedure in proportion to the amount of chain-transfer agents used. Examples of useful chain-transfer agents are any one of the following: long-chain alkyl mercaptans such as t-dodecyl mercaptan, alcohols such as isopropanol, isobutanol, lauryl alcohol, or t-octyl alcohol, carbon tetrachloride, tetrachloroethylene and trichlorobromoethane. Generally from about 0 to about 3% by weight, based on the weight of monomer mixture, of the chain-transfer agent can be used.

The foregoing aspects of emulsion polymerization to provide aldehyde-functional emulsion polymers are well known as described in U.S. Pat. Nos. 4,016,127 and 3,896,085. The disclosure of these patents is incorporated herein by reference.

As mentioned hereinabove, a preferred emulsion polymer used in the invention comprises a two-stage heteropolymer. The combination of monomers which constitute the first and second monomer mixtures used to form the first polymer and the second polymer, respectively, are selected to provide a product heteropolymer having the glass transition temperature ($T_g$) characteristics of a random copolymer having a $T_g$ of greater than about 0° C., preferably from about +10° C. to about 60° C. The monomers of the first monomer mixture forming the first polymer polymer may be the same as the monomers of the second monomer mixture forming the second polymer or may be different, provided the $T_g$ of the first polymer is greater than 0° C., preferably from about +10° C. to about 60° C., and the $T_g$ of the second polymer is about 60° C. to about 0° C. The $T_g$ of the first polymer appears to be more critical than that of the second polymer in order to obtain a product heteropolymer having the $T_g$ characteristics of a random copolymer having a $T_g$ greater than about 0° C., preferably about +10° C. to about 60° C.

The $T_g$ of the first polymer composition and second polymer composition are determinable in a known manner either experimentally or by calculation. The method of calculating the $T_g$ based upon the $T_g$ of homopolymers of individual monomers is described by Fox, Bull. Am. Physics, Soc. 1, 3, p. 123 (1956).

Monomers may be selected to obtain the appropriate $T_g$ through use of the "Rohm and Haas Acrylic Glass Temperature Analyzer", publication CM-24L/cb of Rohm and Haas Company, Philadelphia, Pa.

The heteropolymer compositions are prepared by emulsion polymerization techniques based upon a 2-stage polymerization and gradual addition of the monomer emulsions in each of the two stages. While it is advantageous to initiate and catalyze the reaction in each stage in a conventional manner, wherein the initiator is activated either thermally or by a redox reaction, thermal initiation is preferred from the standpoint of better storage stability of the resulting polymer emulsion and balance of the resulting cured coating for rigid substrates. The latex particle size should be relatively small, of the order of about 300 nm or less, preferably about 100–200 nm. As is well known, given the same polymer backbone, particle size is controlled primarily by the type and level of emulsifier used in each stage of the emulsion polymerization. Molecular weight of the heteropolymers generally is of the order of about 70,000 to 2,000,000 preferably about 250,000 to 1,000,000.

The foregoing and other aspects of two-stage heteropolymer emulsion polymerization are well-known as described, for example, in U.S. Pat. Nos. 3,812,205; 3,895,082; 3,461,188; 3,457,209 and 3,251,904 except for the critical monomer selection described herein.

Heteropolymer compositions which are useful in the invention may also be prepared according to methods described in commonly assigned Ser. No. 876,285, filed Feb. 9, 1978, and in Ser. No. 778,819, filed Mar. 17, 1977, the former being a continuation-in-part of the latter.

The curing, or crosslinking, agent used in the invention is a member selected from the group of dicarboxylic acid bis-hydrazides represented by the formula, $H_2N-NH-C(O)-R-C(O)-NH-NH_2$, dicarboxylic acid bis-hydrazones represented by the formula, $R^1R^2C=N-NH-C(O)-R-C(O)-NH-N=CR^1R^2$, and acrylic oligomers and low molecular weight acrylic solution polymers containing a plurality of pendant hydrazide groups of the formula $-C(O)-NH-NH_2$ or hydrazone groups of the formula $-C(O)-NH-N=CR^1R^2$, wherein R is a member selected from the group consisting of a divalent alkylene group or alicyclic group having from 0 to 34 carbon atoms and a divalent aromatic ring and $R^1$ and $R^2$ are selected from the group consisting of H and ($C_1-C_6$)alkyl and alicyclic groups. The preferred curing agents for use with aqueous emulsion polymers and heteropolymers are the bis-hydrazide compounds and hydrazone derivatives thereof. Examples include oxalic bis-hydrazide (R=a covalent bond), adipic bis-hydrazide (R=$C_4H_8$), azelaic bis-hydrazide (R=$C_7H_{14}$), dimer acid bis-hydrazide wherein R=C$_{34}$H$_{62}$, terephthalic acid bis-hydrazide and isophthalic acid bis-hydrazide, cyclohexane dicarboxylic acid bis-hydrazide, polyethylene oxide bis-acethydrazide, a compound of the formula

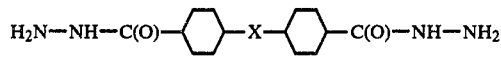

wherein X is —O—, —S—, —S(O)$_2$—, or —C(O)— and the rings are alicyclic or aromatic, and hydrazide-functional polymers, and hydrazone water-soluble derivatives thereof. The preferred curing agents for use with solution polymers containing aldehyde functionality are the acrylic oligomers (that is, oligomers of ester of acrylic acid and methacrylic acid) and low molecular weight acrylic solution polymers containing a plurality of pendant hydrazide or hydrazone groups and the dicarboxylic acid bis-hydrazones described above.

The terms "bis-hydrazide" and dihydrazide" are used synonymously.

The hydrazide and hydrazone curing agents can be prepared by known processes such as by hydrazinolysis of carboxylic ester groups of the precursor dicarboxylic acid or ester group-containing oligomer. This and other hydrazinolysis reactions are described in "The Chemistry of Hydrazides," H. Paulsen and D. Stoye, Chapter 10, pp. 515-600 in "*The Chemistry of Amides*", H. Zabicky, Ed., Interscience Publishers, New York, New York, 1970.

A preferred oligomer is a homopolymer or copolymer of one or more alkyl esters of acrylic acid having a number average molecular weight (Mn) of 1000-5000, the nature and preparation of which is disclosed in co-pending, now-allowed, U.S. application Ser. No. 629,186, filed Nov. 5, 1975, and in its parent U.S. application Ser. No. 214,177, filed Apr. 5, 1972, now-abandoned. (cf. New Zealand Pat. No. 170,274 granted Feb. 3, 1976; French Pat. No. 2,178,850 and corresponding French application No. 7,243,966, filed Dec. 11, 1972). These applications and patents are in the hands of the same assignee as the present application.

Another preferred oligomer is a homopolymer or copolymer of one or more alkyl esters of methacrylic acid having a number average molecular weight (Mn) of 1000-5000, suitable examples of which are described in U.S. application Ser. No. 137,057, filed Apr. 23, 1971, now-abandoned, and U.S. application Ser. No. 371,921, filed June 20, 1973 as a continuation-in-part of the earlier application now-abandoned in favor of continuation-in-part applications which have issued as follows: U.S. Pat. Nos. 4,103,093, July 25, 1978; 4,056,559, Nov. 1, 1977; 4,064,161, Nov. 22, 1977; and 4,133,793, Jan. 9, 1979. (Cf. British Pat. No. 1,393,273 granted Sept. 3, 1975). These applications and patents are in the hands of the same assignee as the present application.

The preferred acrylic solution polymers for use in preparing hydrazide- or hydrazone-functional acrylic solution polymers have a number average molecular weight (Mw) in the range of 1000-5000 and are prepared from C$_1$-C$_4$ alkyl acrylates or methacrylates, with or without comonomers(s) other than the esters of acrylic or methacrylic acid including, for example, styrene, vinyltoluene, and ethylene, by using a high level of free radical initiator in conjunction with conventional chain regulating agents such as mercaptans, methylene chloride, bromotrichloromethane, and the like. The degree of hydrazide functionality obtained by the hydrazinolysis of the above-described acrylic oligomers and low molecular weight solution polymers is generally less than that calculated due to loss of some of the hydrazine charged during the hydrazinolysis reaction. A preferred range of degree of hydrazide functionality for solvent-based coatings is from about 2-5 hydrazide groups or hydrazone groups obtained by suitable further reaction of the hydrazide groups, per oligomer or low molecular weight polymer chain.

As illustrated below, the curing, i.e., crosslinking, of the aldehyde-functional polymers by the hydrazide-functional compound involves the formation of a hydrazone moiety:

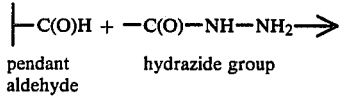

pendant aldehyde group     hydrazide group

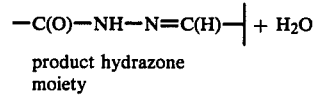

product hydrazone moiety

As illustrated below, the curing, i.e. crosslinking, of the aldehyde-functional polymers by the hydrazone-functional compound involves an interchange between the aldehyde group and the "blocking" carbonyl group of the hydrazone compound:

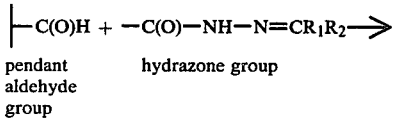

pendant aldehyde group     hydrazone group

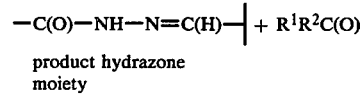

product hydrazone moiety

Both crosslinking reactions illustrated above are equilibrium processes which are driven to completion in cast films by evaporation of the volatile by-product, either water or the carbonyl compound initially reacted with the hydrazide group to form the starting hydrazone curing agent.

The hydrazide or hydrazone curing agent, when it is a water-soluble solid, can be dissolved in water and the resulting aqueous solution can be blended with the dispersion of the aqueous emulsion aldehyde-containing polymer. When the curing agent is a water-insoluble solid, it can be blended with the dispersion of the aqueous emulsion polymer in the form of "neat" finely divided solid particles or in the form of a wettable powder wherein the curing agent is admixed with a finely divided solid such as clays, silicates, and carbonates. Alternatively, the solid particles or wettable powders of the curing agent can be pre-dispersed in water and the resulting dispersion can be blended with the aqueous emulsion powder. When the curing agent is a liquid, it can be blended "neat" with the dispersion of the aqueous emulsion polymer, or it can be dissolved in any suitable organic solvent and blended with the aldehyde-containing solution polymer used in the invention. Well-known adjuvants such as alcohols, ether-alcohols, and amides can be added, optionally, to the hydrazide or hydrazone solutions.

The rate of the crosslinking reaction between the aldehyde-functional polymer and the curing agent or, from a more practical standpoint, the potlife of such a system, depends, in part, on the type and level of aldehyde-containing monomer as well as on the backbone composition of, and on the nature (whether aqueous emulsion or solution) of the aldehyde-functional polymer. Acrolein-based polymers, for example, are more reactive than their methacrolein-based analogs apparently as a result of steric hindrance. This steric effect is enhanced by copolymerizing either of acrolein or methacrolein with bulky monomers such as butyl acrylate, butyl methacrylate, or styrene substituted for portions of smaller monomers such as methyl methacrylate, methyl acrylate, ethyl methacrylate and ethyl acrylate. Other parameters which influence the rate of the curing reaction include the level of hydrazide or hydrazone functionality of the curing agent and the nature of the curing agent.

For use as general industrial coatings, the use of aqueous emulsions comprising a composition containing acrolein-based emulsion polymers haing a $T_g$ of about 10°-60° C. with dicarboxylic acid bis-hydrazides represented by the formula, $H_2N-NH-C(O)-R-C(O)-NH-NH_2$, wherein R is a member selected from the group consisting of diavlent polymethylene groups having from 2 to 34 carbon atoms is especially advantageous in that such compositions demonstrate surprisingly suitable potlife stability, ambient cure and desirable coating properties.

In another aspect, for use as general industrial coatins, the use of acrolein- or methacrolein-based polymers, of both aqueous emulsion and solution types, with acrylate oligomeric and low molecular weight polymeric hydrazides or hydrazones are especially advantageous in that these curing agents are more easily obtained than their methacrylate analogs, in that potlife of coating compositions can be effectively controlled by appropriate selection of the type and level of acrolein- or methacrolein-containing polymers and of the particular curing agent, and in that desirable ambient cure properties and desirable coating properties can be realized.

The compositions of the invention can, optionally, contain any of the additives conventionally used in coatings provided the additives are compatible with the composition. Examples of such additives include coalescents, conventional fillers, pigments, and the like. When aqueous emulsion aldehyde-containing polymers are used, it is most advantageous to add up to about 30% by weight of a coalescent in preparing coating formulations to achieve best results, the amount of coalescent used being dependent on the characteristics of the particular polymer being used.

The following examples serve to further illustrate the invention but are not intended to limit it in any way. All parts and percentages are by weight and all temperatures are in degrees Centigrade, unless otherwise indicated.

The following list defines abbreviations used in the examples:
BA—butyl acrylate
MMA—methyl methacrylate
MACO—methacrolein
AA—acrylic acid
t-BHP—t-butyl hydroperoxide
MAA—methacrylic acid
St—styrene
ACO—acrolein
ADH—adipic dihydrazide
AzDH—azelaic dihydrazide
AzDHzn—azelaic dihydrazone
EA—ethyl acrylate
BMA—butyl methacrylate
HEA—hydroxyethyl acrylate
PZN—polyhydrazone

EXAMPLE 1

This example illustrates a typical preparation of a random acrolein-containing copolymer BA/MMA/MAA/ACO=53/40.7/1.30/5.0, $T_g=10°$ C., using a gradual addition, reflux process as described in greater detail in U.S. Pat. No. 3,896,085 in the hands of the same assignee as is this application.

A monomer emulsion containing the following materials is prepared:

| Ingredient | Amount |
|---|---|
| Water | 720.0 g |
| Sodium lauryl sulfate | 3.5 g |
| BA | 929.0 g |
| MMA | 213.4 g |
| MAA | 22.8 g |
| ACO | 87.7 g |

Into a 5-l., four-neck round bottom flask equipped with a stirrer, themometer and condenser, and nitrogen inlet are charged 738 g of water and 3.5 g. of sodium lauryl sulfate. The flask is flushed with nitrogen and after heating to about 85° C., 66.0 g of the monomer emulsion described above is added. After one minute 42 g of 14% aqueous sodium carbonate and 53.5 g of 16% aqueous sodium persulfate are added consecutively. After 15 minutes, gradual addition of the rest of the monomer emulsion is begun and carried out over a 3-hour period while maintaining the temperature at about 87°-88° C. During the final two hours of the addition of monomer emulsion, 200 g of a 2% aqueous sodium persulfate solution is gradually added at an even rate. A temperature of 87°-88° C. is maintained for one hour after completion of the addition of monomer emulsion. The reaction is cooled to 60° C. rapidly and then allowed to cool at its own rate as a chaser system is added in three equal parts at 30 minute intervals. The chaser system is composed of two solutions: 2.25 g of tert-butylhydroperoxide in 30 g of water, and 3.4 g of sodium bisulfite in 120 g of water. The bisulfite is added 2-5 minutes after the hydroperoxide (three times). After cooling to 24°-30° C., the reaction mixture is filtered through a 100-mesh screen to give the emulsion product.

EXAMPLE 2

Heteropolymer Example

The following example illustrates a typical preparation of an emulsion heteropolymer, 80 (BA/MMA/MAA/ACO=53/40.7/1.30/5.0)//20 (BA/MMA/MAA=56/42.7/1.3).

Monomer emulsions containing the following materials are prepared:

| Ingredient | Amount | |
|---|---|---|
| | Emulsion I | Emulsion II |
| Water | 576.0 g | 144.0 g |
| Sodium lauryl sulfate | 2.8 g | 0.7 g |
| BA | 743.2 g | 196.3 g |
| MMA | 570.7 g | 149.7 g |
| MAA | 18.2 g | 4.6 g |
| ACO | 70.2 g | — |

Into a 5-l., four-neck roundbottom flask equipped with a stirrer, thermometer and condenser, and nitrogen inlet are charged 738 g of water and 3.5 g of sodium lauryl sulfate. The flask is flushed with nitrogen and after heating to about 85° C., 66.0 g of monomer emulsion I is added. After one minute 42 g of 14% aqueous sodium carbonate and 53.5 g of 16% aqueous sodium persulfate are added consecutively. After 15 minutes, gradual addition of the rest of the monomer emulsion is begun and carried out over a 3-hour period while maintaining the temperature at about 87°–88° C. During the final two hours of the addition of monomer emulsion, 200 g of a 2% aqueous sodium persulfate solution is gradually added at an even rate. A temperature of 87°–88° C. is maintained for one hour after completion of the addition of monomer emulsion I. A 50 g portion of 2% aqueous sodium persulfate is added in one portion, followed by gradual addition of monomer emulsion II over 45 minutes while maintaining a temperature of 87°–88° C. Twenty minutes after completion of the addition of monomer emulsion II, the reaction is cooled to 60° C. rapidly and then allowed to cool at its own rate as a chaser system is added in three equal parts at 30 minute intervals. The chaser system is composed of two solutions: 2.25 g of tert-butylhydroperoxide in 30 g of water, and 3.4 g of sodium bisulfate in 120 g of water. The bisulfite is added 2–5 minutes after the hydroperoxide (three times). After cooling to 24°–30° C., the reaction mixture is filtered through a 100-mesh screen to give the emulsion product.

EXAMPLE 3

By following substantially the same procedure described in Example 1, copolymer emulsions are useful in the invention are prepared from monomer emulsions having the following weight ratios of monomers:
A. BA/MMA/MAA/ACO=20/74/1/5.
B. BA/MMA/MAA/ACO/DVB=55/37/3/5/0.09.
C. BA/MMA/MAA/MACO=20/74/1/5.
D. BA/MMA/MAA/MACO=55/37/3/5.
E. BA/MMA/MAA/ACO=55/37/3/5.
F. BA/MMA/MAA/ACO=40/52/3/5.
G. BA/AN/AA/ACO=55/37/3/5.
H. BA/MMA/St/MAA/ACO=40/34/20/1/5.
I. BA/MMA/Vinyl Acetate (VA)/MAA/ACO=40/44/1/5

EXAMPLE 4

A. This example illustrates a typical preparation of an acrolein-containing solution polyer, BA/MMA/St/ACO=40/34/20/6.

In the preparation of this copolymer, the polymerization of the monomers is accomplished with a reaction flask equipped with a stirrer, condenser, nitrogen inlet, addition funnels and a thermometer. Initially, there is charged to the reaction flask, 250 g of Cellosolve acetate and 250 g of n-butanol. Then, nitrogen is admitted into the flask and the solvents are heated to about 105° C. At the solvent temperature of about 105° C., the monomer mixture, consisting of 400 g of butyl acrylate (BA), 340 g of methyl methacrylate (MMA), 200 g of styrene (S) and 60 g of acrolein (Ac), is fed into the flask at a rate sufficient to be completed in about 2.5 hours. At the same time, the initiator solution consisting of 40 g of t-Butyl peroxypivalate (57.8%) and 60 g of Cellosolve acetate is fed at a rate sufficient to complete 90% of it in 2.5 hours with the remainder over 30 minutes. After the addition of the monomeric mixture and initiator solution to the flask, the polymerization temperature of about 105° C. is maintained for 30 minutes. The monomer conversion at this point is about 90%. Then, a second portion of initiator solution, consisting of 8 g of t-Butyl peroxypivalate and 10 g of Cellosolve acetate, is added at a rate sufficient to be completed in 30 minutes at a temperature of about 105° C. and the reaction mixture is held at about 105° C. for 30 minutes. The reaction mixture is finally cooled to room temperature and there is a conversion of about 96% based on the converted monomer.

B. This example illustrates another typical preparation of an acrolein-containing solution polymer, BA/MMA/St/ACO=34/26/20/20.

Into a reaction flask equipped with a stirrer, condenser, nitrogen inlet, additional funnels and thermometer was charged about 474.5 grams of butyl Cellosolve. The flask was then flushed with nitrogen and after being heated to about 105° C. with the solvent being agitated, the monomer mixture (consisting of 340 g of methyl methacrylate, 260 g of butyl acrylate, 200 g of styrene and 200 g of acrolein) with 60 g of t-butyl peroctoate (50% in mineral spirit) was fed into the flask over a three(3) hour period. The flask was heated and cooled as required to hold the polymerization temperature at about 105° C. which was maintained for 30 minutes after the completion of the feed of the monomer mixture and t-butyl peroctoate. Then, over a 30 minutes period, there was added 24 g of t-butyl peroctoate and 474.5 g of butyl Cellosolve. After this charging of the solvents, the reactor was held at a temperature of about 105° C. for about 30 minutes. At the end of this period, 24 g more of t-butyl peroctoate was added to the reaction mixture. The polymerization temperature of about 105° C. was held for another 30 minutes and then the polymerized material was cooled to about 70° C. As analyzed by gas chromatography, the monomer conversion was about 99.4% and the available aldehyde was about 75%.

EXAMPLE 5

This example illustrates a typical preparation of a methacrolein-containing solution polymer, BA/MMA/St/MACO=10/55/20/15.

Into a reactor equipped with a stirrer, condenser, nitrogen inlet, addition funnels and a thermometer there is charged 135 g of butyl Cellosolve. The reactor is then flushed with nitrogen and after the solvent is heated to about 105° C., a monomer mixture consisting of 50 g of butyl acrylate, 275 g of methyl methacrylate, 100 g of styrene and 27.7 g of t-butyl peroctoate (50%) is fed into the reactor over a period of 2 hours. At the same time over a period of 2.25 hours there is fed a second monomer mixture of 25 g of butyl Cellosolve and 75 g of methacrolein while the temperature of the reactor mixture is maintained at about 105° C. Immediately after the completion of the feeding of the first monomer mixture, a solvent mixture of 10 g of butyl cellosolve and 2.3 g of t-butyl peroctoate (50%) is fed into the reactor over a period of 0.25 hours so that it is completed at the same time as the second monomer mixture. The temperature of the reaction mixture is then held at a temperature of about 105° C. for a period of 0.5 hours. Then, another solvent mixture consisting of 10 g of butyl Cellosolve and 4.8 g of t-butyl peroctoate is fed over a period of 0.25 hours. After this period of time, the reaction mixture is held at about 105° C. for 1 hour, cooled and then the product is filtered through a 20 micron cartridge. In the resulting copolymer, there is about 94% conversion and the available aldehyde is 63% of theory.

EXAMPLE 6

By following substantially the same procedure described in Example 4, A or B, the following acrolein-containing solution polymers are prepared:
A. BA/MMA/St/ACO=40/25/20/15
B. BA/MMA/St/ACO=40/20/20/20.
C. BA/MMA/St/ACO/MAA=21.2/45/20/11.8/2.
D. BA/MMA/St/ACO=36/34/20/10.
E. BA/MMA/St/ACO=26/39/20/15.
F. BA/MMA/St/ACO=26/34/20/20.
G. BA/MMA/St/ACO=35/33.2/20/11.8.

EXAMPLE 7

By following substantially the same procedure described in Example 5, the following methacrolein-containing solution polymers are prepared:
A. BA/MMA/St/MACO/MAA=19.6/44.1/19.6/14.7/1.96.
B. BA/MMA/St/MACO=20/45/20/15
C. BMA/St/MAA/MACO=63/20/2/15.
D. BA/MMA/MAA/MACO=62/35/1/2.
E. BA/MMA/MAA/MACO=62/33/1/4.

Examples 8-19 illustrate the synthesis of hydrazide and hydrazone curing, i.e. crosslinking, agents.

EXAMPLE 8

Azelaic Acid bis-hydrazide (AzDH)

A 2000 ml four-neck flask equipped with a thermometer, mechanical stirrer, Friedrich condenser, and 500 ml pressure-equalizing addition funnel is charged with 250 g of 64% hydrazine hydrate (5.0 moles). The hydrazine is heated to 80° C. and a solution of 108 g dimethyl azelate (0.5 mole) in 75 g 2B ethanol is then added slowly to the flask over a period of 2.0 hours. During this process, the bishydrazide crystallizes from solution. The reaction mixture is stirred 1.0 hour longer at 80° C. whereupon it is cooled to ambient temperature, diluted with 100 ml of diethyl ether, stirred briefly, and filtered. Recrystallization of the filtered solid from water affords 88.5 g of product (82%), mp. 187°–188° C.

EXAMPLE 9

Azelaic Acid Bis-hydrazones (AzDHzn)

A 250 ml three-necked flask equipped with a thermometer, mechanical stirrer, and Freidrich condenser is charged with 21.6 g of azelaic acid bishydrazide (0.1 mole), 15 ml of glacial acetic acid, and 0.5 mole of the aldehyde or ketone. The mixture is heated at 50°–80° C. until complete solution is effected. When necessary, 50 ml of 2B ethanol is added as a diluent. Evaporation of the mixture in vacuo and crystallization of the residue from an appropriate solvent then affords the purified bishydrazone. The products are summarized on the accompanying table.

Table I

| Aldehyde or Ketone | Reaction Time/ Temperature | Crystallization Solvent | Melting Point |
|---|---|---|---|
| A. acetone | 1.5 hrs/60° C. | benzene/ hexane | 126°–127° C. |
| B. isobutyraldehyde | 3.0 hrs/60° C. | ethanol | 120°–122° C. |
| C. methyl ethyl ketone | 2.0 hrs/50° C. | hexane | 73°–75° C. |
| D. cyclohexanone | 3.0 hrs/50° C. | hexane | 140°–142° C. |
| E. methyl isobutyl ketone | 2.0 hrs/65° C. | hexane | 81°–83° C. |
| F. diisobutyl ketone | 1.5 hrs/80° C. | ethanol | 116°–118° C. |

EXAMPLE 10

Adipic Acid Bis-hydrazide (ADH)

By following substantially the procedure described in Example 7 except for the substitution of dimethyl adipate for dimethyl azelate, adipic acid bis-hydrazide is prepared.

EXAMPLE 11

Adipic Acid Bis-hydrazone (ADHzn)

By following substantially the procedure described in Example 8 except for the substitution of dimethyl adipate for dimethyl azelate, adipic acid bis-hydrazone is prepared.

EXAMPLE 12

Dimer Acid Bis-hydrazide

A 2000 ml four-necked flask equipped with a thermometer, "Thermowatch" temperature regulator, mechanical stirrer, Friedrich condenser, and 1000 ml pressure-equalizing addition funnel is charged with 250 ml of 65% hydrazine hydrate (5.0 moles). The hydrazine is heated to reflux (110° C.) and a solution of 294 g of dimer acid dimethyl ester (0.5 mole) in 240 g of toluene is then added slowly to the flask over a period of 6.0 hours. The mixture is maintained at reflux 8.0 hours longer at which point it is cooled and transferred to a separating funnel to facilitate phase separation. The lower aqueous layer is discarded; the upper organic layer is thoroughly evaporated in vacuo (1.0 mm) at 95° C. to afford the product as a viscous pale yellow oil. Solids: 97.2%; Residual Hydrazine Titer: 0.10 meq/g; Hydrazide functionality: 1.94.

Samples of the bishydrazide are converted to bishydrazones with acetone, methyl amyul ketone, and methyl isobutyl ketone, respectively, via the procedure described in Example 9.

EXAMPLE 13

Preparation of Ethyl Acrylate Oligomer

A 5000 ml four-necked flask equipped with a thermometer, "Thermowatch" temperature regulator, condenser, mechanical stirrer, and 2000 ml pressure-equalizing addition funnel fitted with a nitrogen ebullator is charged with 356.4 g of toluene and 70.56 g of potassium t-butoxide (0.63 mole). The mixture is heated to 70° C. and to it is then added 3150 g of ethyl acrylate (31.5 moles) over a period of 2.0 hours at a rate sufficient to maintain the system at temperture. To complete the reaction, the mixture is held 2.0 hours longer at 70° C., then cooled, neutralized with 32.3 g of 98% sulfuric acid, and treated with 300 g of 33% aqueous aluminum sulfate solution to facilitate removal of the resultant salts. Volatiles are removed by distillation in vacuo (30 mm) at 95° C. and the residue is filtered under pressure to afford the product oligomer as a clear amber liquid. Solids: Brookfield Viscosity: 9100 cps; $\overline{M}w$ 2270; $\overline{M}n$ 1060; $\overline{M}w/\overline{M}n=2.14$; d.p. 10.6

EXAMPLE 14

Polyhydrazide Derived from Ethyl Acrylate Oligomer

A 200 ml four-necked flask equipped with a thermometer, mechanical stirrer, and Friedrich condenser charged with 56.5 g of ethyl acrylate oligomer ($\overline{M}w$ 2930, $\overline{M}n$ 1130, d.p. 11.3, 0.05 mole) and 75 g of 64% hydrazine hydrate (1.5 moles). The mixture is heated under nitrogen at 95° C. for 1.5 hours. Excess hydrazine is removed by distillation in vacuo (30 mm) at 60° C. The residue is dissolved in 25 ml of deionized water and the resulting solution is then diluted with 450 ml of absolute methanol to precipitate the product as a white powder. Hydrazine functionality: 7.5; Perchloric Acid Titer: 7.54 meq/g; Elemental Analysis: Calculated for $—CH_2—CH—CON_2H_3$; Carbon: 41.79%; Hydrogen: 7.01%; Nitrogen: 32.64%; Found: Carbon: 40.75%; Hydrogen: 6.95%; Nitrogen: 28.60%.

EXAMPLE 15

Polyhydrazone Derived from Butyl Acrylate Oligomer

A 1000 ml four-necked flask equipped with a thermometer, "Thermowatch" temperature regulator, mechanical stirrer, and condenser is charged with 150 g of 2-methoxyethanol, 460 g of butyl acrylate oligomer ($\overline{M}w$ 2870, $\overline{M}n$ 1230, d.p. 9.6, 0.374 mole), prepared by following substantially the same procedure described in Example 11, and 101.2 g of 64% hydrazine hydrate (2.02 moles). The mixture is heated under nitrogen at 85° C. for 4.0 hours. Excess hydrazine is then removed by distillation under reduced pressure (1.0 mm) at 60° C. to give the product. Hydrazide functionality: 2.9.

The viscous polyhydrazide is heated with 300 g of acetone (5.2 moles) and 1 ml of glacial acetic acid for 1.0 hour at 50°14 55° C. Excess acetone and water are then removed by evaporation under reduced pressure (25–30 mm) at temperatures up to 50° C. Dilution of the residue with 2-butoxyethanol affords the polyhydrazone as a clear amber solution. Solids: 54.3%, Perchloric Acid Titer: 3.15 meq/g.

EXAMPLE 16

Polyhydrazone Derived from Methyl Methacrylate Oligomer

A 1000 ml four-necked flask equipped with a thermometer, "Thermowatch" temperature regulator, mechanical stirrer, Dean-Stark trap, and condenser is charged 250 g of methyl methacrylate oligomer ($\overline{M}w$ 732, $\overline{M}n$ 645, d.p. 6.45, 0.388 mole), 85 g of 2-methoxyethanol, and 68 g of 64% hydrazine hydrate (1.36 moles). The mixture is heated at 85° C. for 13 hours at which point the rate of consumption of the hydrazine decreased significantly. The byproduct methanol is then removed via the Dean-Stark trap to raise the reaction temperature to 115° C. To complete the reaction, the mixture is maintained at temperature 18.5 hours longer. The product polyhydrazide is then treated with 450 ml of acetone at 60° C. for 3.0 hours. Evaporation of the mixture in vacuo (1.0 mm) at 60–65° C. and dilution of the viscous residue with 2-butoxyethanol affords the polyhydrazone as a clear amber solution. Solids: 65.0%; Perchloric Acid Titer: 2.74 meq/g.

EXAMPLE 17

Preparation of 50 BA/50 MMA Polymer

A 5000 ml four-necked flask equipped with a thermometer, "Thermowatch" temperature regulator, condenser, mechanical stirrer, and 2000 ml pressure-equalizing addition funnel fitted with a nitrogen ebullator is charged with 500 g of 2-butoxyethanol. The solvent is heated to 150° C. and a sparged mixture of 1000 g butyl acrylate (7.8 moles), 1000 g methyl methacrylate (10.0 moles), 20 g mercaptoethanol (chain transfer agent - 1 wt. % on monomer), and 80 g of a 75% solution of t-butyl peracetate initiator in mineral spirits (3 wt. % on monomer) is then added slowly to the flask over a period of 6.0 hours. The reaction mixture is held 0.25 hour longer at 150° C., treated with 8.0 g of Lupersol 70 (0.25 hour) to chase residual monomer, and then held an additional 0.25 hour at temperature to afford the product polymer as a clear, dark yellow solution with the following specifications: Solids: 79.8%; Brookfield Viscosity: 6,260 cps; $\overline{M}w$ 5530, $\overline{M}n$ 2310; $\overline{M}w/\overline{M}n=2.39$, d.p. 20.2; Conversion: 96.5% (GLC).

EXAMPLE 18

Polyhydrazide Derived from 50 BA/50 MMA Polymer

A 1000 ml four-necked flask equipped with a thermometer, "Thermowatch" temperature regulator, mechanical stirrer, variable take-off distillation head and nitrogen ebullator is charged with 433 g of an 80% solution of 50 BA/50 MMA polymer ($\overline{M}w$ 5530, $\overline{M}n$ 2310, d.p. 20.2, 0.15 mole) in 2-butoxyethanol, 22.5 g of 64% hydrazine hydrate, and 260 g of 2-methoxyethanol. The mixture is sparged with nitrogen and then heated 23 hours at 110° C. and 16 hours at 115°–118° C. at which point the product polyhydrazide had the following specifications: Residual Hydrazine Titer: 0.04 meq/g; Perchloric Acid Titer: 0.54 meq/g; Hydrazide functionality: 2.4. The reaction mixture is then diluted with 125 g of 2-butoxyethanol and then stripped of volatiles in vacuo (25–30 mm) at 70°–70° C. to give the product polyhydrazide as a clear yellow orange solution in 2-butoxyethanol. Solids: 85.1%; Perchloric Acid Titer: 0.85 meq/g.

Samples of the polyhydrazide are diluted with additional 2-butoxyethanol and then treated with a two-fold excess of acetone, methyl amyl ketone, and methyl isobutyl ketone, respectively, to afford the corresponding polyhydrazones.

TABLE II

| Polyhydrozones Derived From 50 BA/50 MMA Polymer | | | |
|---|---|---|---|
| Ketone | HC1O4 Titer | Solids | Brookfield Viscosity |
| acetone | 0.57 meq/g | 59.9% | 900 cps |
| methyl amyl ketone | 0.58 meq/g | 60.2% | 1100 cps |
| methyl isobutyl ketone | 0.58 meq/g | 60.7% | 1250 cps |

EXAMPLE 19

Polyhydrazide Derived from 20 EA/80 BMA Polymer

A 1000 ml four-necked flask equipped with a thermometer, "Thermowatch" temperature regulator, mechanical stirrer, variable take-off distillation head, and nitrogen ebullator is charged with 520 g of an 80% solution f 20 EA/80 BMA polymer ($\overline{M}w$ 4430, $\overline{M}n$ 2080, d.p. 16.6, 0.20 mole) in 2-butoxyethanol, 30 g of 64% hydrazine hydrate (0.60 mole), and 312 g of 2-methoxyethanol. The mixture is sparged with nitrogen and then heated 17.5 hours at 110° C. and 39.0 hours at 118°–120° C. at which point the product polyhydrazide has the following specifications: Residual Hydrazine Titer=0.06 meq/g; Perchloric Acid Titer: 0.583 meq/g; Hydrazide functionality: 2.3. The reaction mixture is then stripped of volatiles in vacuo (25–35 mm) at 60°–70° C. to give the product polyhydrazide as a hazy light yellow solution in 2-butoxyethanol. Solids: 83.9%; Perchloric Acid Titer: 0.96 meq/g.

Samples of the polyhydrazide are treated with a twofold excess of acetone, methyl amyl ketone, and methyl isobutyl ketone, respectively, to produce the corresponding polyhydrazones.

TABLE III

Polyhydrazones Derived From 20 EA/80 BMA Polymer

| Ketone | $HClO_4$ Titer | Solids | Brookfield Viscosity |
|---|---|---|---|
| acetone | 0.84 meq/g | 77.6% | 13,125 cps |
| methyl amyl ketone | 0.82 meq/g | 76.0% | 7,875 cps |
| methyl isobutyl ketone | 0.83 meq/g | 80.8% | 22,250 cps |

EXAMPLE 20

For purposes of evaluation clear films are made of aldehyde-functional emulsion polymers and hydrazide curing agents by blending into the emulsion polymer the curing agent, the relative proportions being such as to provide a 1:1 ratio of hydrazide and aldehyde groups. After about 15 min., the curing agent is dissolved and with butyl Cellosolve (50% aqueous solution) is added as a coalescent, and the resulting mixture is made basic to a pH=9.5 by adding concentrated (28%) ammonium hydroxide. The results of the evaluation are set forth in Table IV below.

TABLE IV

Evaluation of Aldehyde Copolymer/Dihydrazide Blends for Heat-Age Stability
Film Cure Conditions: 3 wks. ambient or (16 hr./60° C.)

| Polymer/Curing Agent | Blends Aged 10 Days at Ambient | | | Blends Aged 10 Days at 60° C. | | |
|---|---|---|---|---|---|---|
| | KHN | Block (20 min./60° C.) | Swell Ratio (THF) | KHN | Block (20 min./60° C.) | Swell Ratio (THF) |
| Polymer A/ADH | 1.01(1.01) | 4 (5) | 3.7 (3.1) | 0.75(2.28) | 0 (0) | 3.5 (3.2) |
| Polymer B/ODH | 2.93 (2.46) | 8 (8) | 2.4 (2.4) | 1.96(1.55) | 2 (2) | 3.2 (3.2) |
| Polymer C/ODH | — (2.98) | 3 (0) | 2.6 (2.6) | 1.46(1.20) | 0 (0) | 3.2 (3.2) |
| Polymer D/ODH | 1.37(1.19) | 3 (5) | 3.9 (3.5) | 1.18(1.17) | 0 (0) | disintegrated |
| Polymer D/ADH | 1.82(1.52) | 0 (0) | 3.2 (2.9) | 2.28(1.72) | 0 (0) | 2.9 (2.9) |
| Polymer A/ODH | 0.81(0.90) | 4 (4) | 3.2 (3.2) | 0.58(0.90) | 0 (0) | 3.5 (3.5) |
| Polymer B/ADH | 2.74(2.16) | 6 (6) | 2.6 (2.4) | 2.42(2.02) | 5 (5) | 2.8 (2.8) |
| Polymer C/ADH | 1.55(2.23) | 1 (0) | 2.6 (2.9) | 1.38(1.89) | 0 (0) | 2.8 (2.8) |

Polymer Compositions and Calculated Tg
Polymer A = 85 BA/7 MMA/3 MAA/5 Ac (Tg, −28° C.)
Polymer B =.55 BA/37 MMA/3 MAA/5 Ac (Tg, +10° C.)
Polymer C = 70 BA/24 MMA/1 MAA/5 MAc (Tg, −6° C.)
Polymer D = 55 BA/37 MMA/3 MAA/5 MAc (Tg, +14° C.)

CURING AGENTS
ADH=Adipic Dihydrazide
ODH=Oxalic Dihydrazide

EXAMPLE 21

A. Preparation of Paint Formulations

Using conventional methods the following paint formulations are prepared. The let-down components are added in the order listed.

Binder A: Rhoplex ® AC-61 (Rohm and Haas Co.)
Binder B: Copolymer of Example 3E/6.0% ADH and 5.0% butyl Cellosolve (on polymer solids)
Binder C: Copolymer of Example 3F//5.5% ADH and 14.0% butyl Cellosolve (on polymer solids)

| Grind: | A | B | C |
|---|---|---|---|
| $TiO_2$, RCL-9 | 78.15 | 78.15 | 78.15 |
| Tamol 731-25% | 3.13 | 3.13 | 3.13 |
| Nopco NDW | 0.58 | 0.58 | 0.58 |
| Propylene Glycol | 18.14 | 18.14 | 18.14 |
| Let-Down | | | |
| propylene glycol | 16.15 | 16.5 | 16.5 |
| Nopco NDW | 0.8 | 0.8 | 0.8 |
| Binder | 162.1 | 162.1 | 166.1 |
| Super-Ad-It | 0.3 | 0.3 | 0.3 |
| $H_2O$ Pre-Mix | 4.0 | 4.0 | 4.0 |
| Triton GR-7 | 0.6 | 0.6 | 0.6 |
| QP 4400 (3.5%) | — | 18.9 | 7.4 |
| $H_2O$ | — | — | 7.5 |
| Paint PVC | 22.8 | 22.8 | 22.8 |
| Volume Solids | 35.5 | 35.5 | 35.6 |
| pH, initial/equilibrated | 8.8/8.8 | 8.8/8.8 | 8.9/8.9 |
| Visc (Krebs Units), init./equilibrated | — | 78/87 | 72/77 |

The physical properties of cured paint films of the formulations described above which are applied to substrates is described in Table V as follows:

Table V

| | A | B | C |
|---|---|---|---|
| Paint Film Data | | | |
| Heat-Age Stability 10 days 60° C. | | | |
| Visc., cps., pre-oven | 2100 | 2900 | 1700 |
| Visc., cps., post-oven | 3200 | 3500 | 1800 |
| pH, pre-oven | 8.9 | 8.8 | 8.9 |
| pH, post-oven | 8.4 | 8.0 | 8.1 |

Table V-continued

| | A | B | C |
|---|---|---|---|
| Drawdown Gloss, 1 wk, 60°/20° | 60/15 | 48/8 | 48/8 |
| Abrasive Scrub, Cycles to Failure | | | |
| 1 wk air-dry, as is | 950 | 350 | 365 |
| 2 wk air-dry, as is | 1050 | 750 | 600 |
| 2 wk heat aged | 1500* | 750 | 570 |
| KHN (1.5 mil film) | | | |
| 1 wk air-dry | 0.85 | — | — |
| 2 wk air-dry | 1.05 | 3.16 | 13.7 |
| —Baked 16 hr., 60° C. | 2.25 | 3.54 | 13.3 |
| Print (1 lb., 1 hr 60° C.) | | | |
| 1 wk air-dry | 7 | — | — |
| 2 wk air-dry | 6, 7 | 8 | 9 |
| 4 wk air-dry | 7 | 8 | 9 |
| Baked 16 hr., 60° C. | 7 | 8 | 9 |
| Block (2 lb., 60° C., listed oven time) | | | |
| 1 wk air-dry, as is | | | |
| 20 min/4 hr | 0— | — | — |
| 2 wk air-dry, as is | | | |
| 20 min/4 hr | 0/0 | 7/5 | 7/6 |
| 2 wk air-dry, heat aged | | | |
| 20 min/4 hr | 0/0 | 6/5 | 7/5 |
| 4 wk, air-dry, as is, | | | |
| 20 min/4 hr | 0/0 | 6/6 | 7/7 |
| 16 hr, 60° C., as is, | | | |
| 20 min/4 hr | 0/0 | 6/6 | 7/7 |
| Weatherometer Data | | | |
| KHN | | | |
| 0 hrs | 1.8 | 3.6 | 13.7 |
| 500 hrs | 5.2 | 3.5 | 16.9 |
| 1000 hrs | 4.7 | 2.2 | 14.4 |
| 1400 hrs | 5.4 | 1.8 | 14.6 |
| 1900 hrs | 6.2 | 2.7 | 14.0 |
| Gloss (60°/20°) | | | |
| 0 hrs | 56/19 | 48/8 | 48/9 |
| 500 hrs | 46/17 | 20/2 | 18/2 |
| 1000 hrs | 36/6 | 44/6 | 39/5 |
| 1400 hrs | 22/2.7 | 42/6 | 39/5 |
| 1900 hrs | 13/1 | 16/1 | 23/1 |
| Mandrel Flex | | | |
| 0 hrs | P 1/8 | P 1/8 | F 1/2 |
| 500 hrs | P 1/8 | P 1/8 | F 1/2 |

EXAMPLE 22

Clear Films of Oligomer-Based Polyhydrazones and Aldehyde-Functional Polymers

For purposes of evaluation, clear films are made of compositions of oligomer-based polyhydrazones reacted with ACO- and MACO-containing solution polymers.

A paint is prepared by blending about 50 parts of the aldehyde-containing polymer and a stoichiometric amount of the hydrazone are dissolved in about 100 parts of xylene. The paint is then cast on 24 gauge Bonderite 40 panels by a 7 mil opening drawdown castor. The paints are dried, as described in Table VI below, for 7 days at ambient temperature or at 140° F.

Pot-life or gel time is the time, after blending the aldehyde-containing polymer and the hydrazone curing agent, for the blend to gel as determined by periodic manual stirring of the blend with a stirring rod.

Film hardness is determined on a Tukon Hardness Tester and is reported as Knoop Hardness Number (KHN).

Print resistance is determined by the relative amount of indentation of a test sample, compared with a standard, prepared by applying to Bonderite panels the paint blend, covering the painted panels with 2" square cheesecloth squares, placing a leather disc smooth side down on the cheesecloth, adding weights on the leather so as to produce a 2 psi load on the cheesecloth, and placing this sandwich in an oven preheated and maintained at 180° F. for 2 hrs.

The Mandrel Bend test is a determination of the flexibility of a paint or coating. Samples of the coated metal are bent over a series of mandrels, $\frac{1}{8}$", $\frac{1}{4}$" and $\frac{1}{2}$" in diameter, by hand so as to form a U-shaped cross-section. The film is examined by visual means and through a 30 magnification power microscope. No signs of cracks in the film is rated zero and the scale increases with the severity of cracking to a rating of 10, representing a severely cracked film exhibiting complete delamination of the film from the substrate.

The physical properties of these films, presented in Table VI below, demonstrate that the compositions employed cure substantially at ambient conditions.

Table VI

Clear Film Properties (7 days) of Butyl Acrylate Oligomer[6]-Based Polyhydrazones and Aldehyde-Functional Polymers

| Blend[1] Polymer/Oligomer Hydrazone | Cure Conditions | KHN[2] | Print[3] | Mandrel[4] | | | | Pot Life (Hrs.) |
|---|---|---|---|---|---|---|---|---|
| | | | | $\frac{1}{8}$" | $\frac{1}{4}$" | $\frac{1}{2}$" | QCT[5] | |
| Polymer A[7]/Example 15 | Ambient/7 days | 5.1 | L-M | 0 | 0 | 0 | F- | 0.08 |
| | 140° F./7 days | 5.3 | L | 0 | 0 | 0 | P | — |
| Polymer B[8]/Example 15 | Ambient/7 days | 5.4 | L | 0 | 0 | 0 | P | 8 |
| | 140° F./7 days | 6.5 | L | 0 | 0 | 0 | P | — |
| Polymer C[9]/Example 15 | Ambient/7 days | 2.4 | L-M | 0 | 0 | 0 | P | 0.08 |
| | 140° F./7 days | 3.2 | L-M | 0 | 0 | 0 | P- | — |
| Polymer D[10]/Example 15 | Ambient/7 days | 3.6 | VL | 10 | 0 | 0 | P- | 0.08 |
| | 140° F./7 days | 5.4 | VL | 10 | 10 | 0 | P- | — |
| Polymer E[11]/Desmodur N | Ambient/7 days | 10.3 | VL | 0 | 0 | 0 | P- | 8 |
| | 140° F./7 days | 12.2 | VL | 0 | 0 | 0 | P- | — |

[1]Stoichiometric Blends of Hydrazone and Aldehyde Functionality
[2]KHN: Film hardness measured with Tukon Hardness Indenter
[3]Print: 18°F./2 hours/2 PSI; L = light; H = heavy; TR = trace
[4]Mandrel: 0 = pass; 10 = fail
[5]QCT: P = pass; F = fail; 140° F./20 hours
[6]Butyl Acrylate Oligomer = Example 15
[7]Polymer A = 35 BA/33.2 MMA/20 St/11.8 ACO
[8]Polymer B = 30 BA/35 MMA/20 St/15 MACO
[9]Polymer C = 40 BA/25 MMA/20 St/15 ACO
[10]Polymer D = 40 BA/20 MMA/20 St/20 ACO
[11]Polymer E = 42 MMA/20 St/20 MBA/18 HEA/1 AA

EXAMPLE 23
Clear Films of Oligomer-Based Polyhydrazides and Aldehyde-Functional Emulsion Polymers For purposes of evaluation, clear films are made of compositions of an oligomer-based ethyl acrylate polyhydrazide reacted with ACO—and MACO-containing polymers. The physical properties of these respective films are presented in Table VII below.

The aldehyde-functional emulsion polymers are treated with NH4OH to obtain a pH of about 9.0, and then are blended, respectively, with 40% aqueous solution of the polyhydrazide. Films are cast from the resulting dispersions on aluminum (Al) and Bonderite-1000 (B-1000) panels and cured at ambient temperature for about 4 to 7 days. The films are then exposed to different solvents, for thirty minutes at ambient temperature.

Table VII
Clear Film Properties
Hydrazide-functional Ethyl Acrylate Oligomer* and Various Aldehyde-functional Emulsion Polymers

| Polymer | Substrate | Appearance | Toluene | Solvent Resistance Water | Acetone |
|---|---|---|---|---|---|
| Polymer A | Al | clear, very sl. tack | sl. soft., good adhes. | no effect | sl. soft., good adhes. |
| | B-1000 | clear sl. tack flash rusting | sl. soft., good adhes. | no effect | sl. soft |
| Polymer B | Al | hazy, tack-free | mod. soft., sl. embrit. good adhes. | sl. soft., whitening | mod. soft., sl. embrite. good adhesion |
| | B-1000 | hazy, tack-free, flash rusting | sl. soft., good adhes. | whitening good adhes. | sl. soft |
| Polymer C | Al | hazy, tack-free sl. haze | embrit., good adhes | sl. soft., whitening | sl. soft., good adhes. |
| | B-1000 | sl. haze, tack-free flash rusting | sl. embrit. good adhes | whitening, good adhes | sl. soft |
| Polymer A alone Control | B-1000 | hazy. mod. tack flash rusting | mod soft, mod. adhes. | no effect | no effect |

*Example 14 = Polyhydrazide Derived from Ethyl Acrylate Oligomer
Polymer A = BA/AN/AA/ACO (83/14/2/1).
Polymer B = BA/MMA/MAA/MACO (62/35/1/2).
Polymer C = BA/MMA/MAA/MACO (62/33/1/4).

EXAMPLE 24

For purposes of evaluation, clear films are made, as described in Example 22 above, from azelaic acid bishydrazones reacted with ACO- and MACO-containing polymers. The physical properties thereof are presented in Table VIII below. Yellowing is determined by means of a Hunterlab Colorimeter Model D25A-4 utilizing the Yellowness Index procedure ASTM D 1925.

Table VIII
Clear Film Properties of Azelaic Acid Bishydrazone and Carbonyl-Functional Polymers

| Polymer/ Bishydrazone | Cure Conditions | Pencil Hardness | Solvent Resistance Toluene (5 min) | Water (30 min) | Yellowing |
|---|---|---|---|---|---|
| Example 6D/ Example 9D | Ambient/5 days | H | softened | no effect | — |
| | 150° C./30 min | 4H | softened | no effect | slight |
| Example 6E/ Example 9D | Ambient/5 days | H | softened | no effect | — |
| | 150° C./30 min | 3H | softened | no effect | moderate |
| Example 6F/ Example 9D | Ambient/5 days | H | softened | no effect | — |
| | 150° C./30 min | 4H | no effect | no effect | severe |
| Example 6C/ Example 9D | Ambient/5 days | 3B | dissolved | softened | — |
| | 150° C./30 min | H | disintegrated | no effect | moderate |
| Example 6D/ Example 9E | Ambient/4 days | 2B | disintegrated | no effect | — |
| | Ambient/10 days | H | disintegrated | no effect | — |
| | 150° C./30 min | 2H | badly softened | very sl. softened | slight |
| Example 6E/ Example 9E | Ambient/4 days | 2B | disintegrated | no effect | — |
| | Ambient/10 days | F | disintegrated | no effect | — |
| | 150° C./30 min | 2H | badly softened | very sl. softened | slight |
| Example 6F/ Example 9E | Ambient/4 days | 3H | sl. softened | no effect | — |
| | Ambient/10 days | 2H | sl. softened | no effect | — |
| | 150° C./30 min | 3H | softened | no effect | severe |
| Example 6C/ Example 8E | Ambient/4 days | 2B | dissolved | no effect | — |
| | Ambient/10 days | 3B | dissolved | no effect | — |
| | 150° C./30 min | 2B | dissolved | slightly embrittled | — |

EXAMPLE 23

For purposes of evaluation, clear films are made from dimer acid bis-hydrazide (Example 12) reacted with ACO- and MACO-containing solution polymers. The physical properties of the films are presented in Table IX below.

Table IX

| Clear Film Properties of Dimer Acid Bishydrazide and Carbonyl-Functional Polymers[1] | | | | | | |
|---|---|---|---|---|---|---|
| | Polymer | | Polymer and Bishydrazide | | Solvent Resistance[6] | |
| Polymer | Pencil Hardness | KHN | Pencil Hardness | KHN | Toluene (5 min) | Water (30 min) |
| Example 6D | 2B | 0.8 | H | 9.0 | disintegrated | sl. embrittled |
| Example 6E | 2B | 1.0 | — | — | — | — |
| Example 6F | 2B | 1.2 | — | — | — | — |
| Example 7C | 2B | 2.7 | H | 6.8 | softened badly | no effect |

[1]Stoichiometric blends of hydrazide and carbonyl functionality; films cured 5 days at ambient temperature on aluminum panels. After 30 minutes at 150° C., the pencil hardness of films increased to 2H–3H with no appreciable change in solvent resistances. No yellowing was observed on bake.
[2]Films of the polymers alone dissolve on exposure to toluene for 5 minutes. Water has no effect on the ACO- and MACO-based polymers after 30 minutes.

What is claimed is:

1. An ambient or low-temperature curable polymer composition adapted to coat a rigid substrate comprising:

a. a polymer polymerized from a monomer mixture comprising (1) from about 0.25% to about 35% by weight of a polymerizable aldehyde, and (2) at least one copolymerizable mono-ethylenically unsaturated monomer selected from the group consisting of $\alpha,\beta$-ethylenically unsaturated carboxylic acid, ($C_1$–$C_{24}$)alkyl methacrylates, ($C_1$–$C_{24}$)alkyl acrylates, vinylidene halides, vinyl halides, (meth)acrylonitrile, vinyl esters, ethylene and alpha-olefins, acrylic and methacrylic acid esters of alcohol-ethers, vinyl ether, styrene and alkyl-substituted styrenes and vinyl aromatics, the combination of monomers being selected to provide a $T_g$ of the polymer of greater than about 0° C.; and b. a curing agent comprising a member selected from the group consisting of a dicarboxylic acid bis-hydrazide represented by the formula, $H_2N$—NH—C(O)—R—C(O)—NH—$NH_2$, and a dicarboxylic acid bis-hydrazone represented by the formula $R^1R^2C$=N—NH—C(O)—R—C(O)—NH—N=$CR^1R^2$, and acrylic oligomers and low molecular weight acrylic solution polymers containing a plurality of pendant hydrazide groups of the formula —C(O)—NH—$NH_2$ or hydrazone groups of the formula —(O)—NH—N=$CR^1R^2$, wherein R is a member selected from the group consisting of a divalent alkylene group or alicyclic group having from 0 to 34 carbon atoms and a divalent aromatic ring and $R^1$ and $R^2$ are selected from the group consisting of H and ($C_1$–$C_6$) alkyl and alicyclic groups, the amount of hydrazide or hydrazone compound being selected to provide a ratio of hydrazide or of hydrazone groups to aldehyde groups of the polymer in the dispersion of from about 1:2 to 2:1.

2. The composition of claim 1 wherein the polymer component comprises an aqueous emulsion polymer containing from about 30% to about 60% by weight resin solids polymerized from a monomer mixture comprising (1) from about 0.5% to about 10% by weight of a polymerizable aldehyde selected from the group consisting of acrolein and methacrolein, (2) from about 0.5% to about 10% by weight of an $\alpha,\beta$-ethylenically unsaturated carboxylic acid selected from the group consisting of acrylic acid and methacrylic acid, and (3) up to about 99% by weight of at least one copolymerizable monomer, the combination of the monomers being selected to provide a $T_g$ of the polymer of from about +10° C. to about 60° C.

3. The composition of claim 1 wherein the polymer component comprises an aqueous emulsion heteropolymer, containing from about 30% to about 60% by weight resin solids, the particles of which comprise (a) about 50 parts to 85 parts by weight of a first polymer having a $T_g$ of greater than 0° C. formed by emulsion polymerization of a first monomer mixture comprising (1) from about 0.5% to about 10% by weight of a polymerizable aldehyde selected from the group consisting of methacrolein and acrolein, (2) from about 0.5% to about 10% by weight of at least one $\alpha,\beta$-ethylenically unsaturated carboxylic acid, and (3) up to about 99% by weight of at least one copolymerizable mono-ethylenically unsaturated monomer; and (b) about 15 parts to 50 parts by weight of a second polymer having a $T_g$ of about 60° C. to about 0° C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

4. The composition of claim 1 wherein the polymer component comprises an aqueous emulsion polymer, containing from about 30% to about 60% by weight resin solids, polymerized from a monomer mixture comprising (1) from about 1% to about 7.5% by weight of acrolein, (2) from about 1% to about 7% by weight of at least one $\alpha,\beta$-ethylenically unsaturated carboxylic acid selected from the group consisting of acrylic acid and methacrylic acid, and (3) up to about 98% by weight of at least one monomer selected from the group consisting of ($C_1$–$C_{24}$) alkyl methacrylates, and ($C_1$–$C_8$) alkyl acrylates, the combination of the alkyl methacrylates and the alkyl acrylates being selected to provide a $T_g$ of the polymer of from about +10° C. to about 60° C.

5. The composition of claim 1 wherein the polymer component comprises a solution polymer polymerized from a monomer mixture comprising (1) from about 5% to about 30% by weight of a polymerizable aldehyde selected from the group consisting of acrolein and methacrolein, (2) from about 0 to about 10% by weight of at least one $\alpha,\beta$-ethylenically unsaturated carboxylic acid selected from the group consisting of acrylic acid and methacrylic acid, and (3) up to about 99.25% of at least one member selected from the group consisting of ($C_1$-$C_{24}$) alkyl acrylates, ($C_1$-$C_{24}$) alkyl methacrylates, styrene and alkyl styrenes, and vinyl toluene.

6. The composition of claim 2 wherein the curing agent comprising a member selected from the group consisting of a dicarboxylic acid bis-hydrazide represented by the formula, $H_2N-NH-C(O)-R-C(O)-NH-NH_2$, and a dicarboxylic acid bis-hydrazone represented by the formula $R^1R^2C=N-NH-C(O)-R-C(O)-NH-N=CR^1R^2$, wherein R is a member selected from the group consisting of a divalent alkylene group and an alicyclic group having from 0 to 34 carbon atoms and a divalent aromatic ring and $R^1$ and $R^2$ are selected from the group consisting of H and ($C_1$-$C_6$) alkyl and alicyclic groups.

7. The composition of claim 3 wherein the curing agent comprising a member selected from the group consisting of a dicarboxylic acid bis-hydrazide represented by the formula, $H_2N-NH-C(O)-R-C(O)-NH-NH_2$, and a dicarboxylic acid bis-hydrazone represented by the formula $R^1R^2C=N-NH-C(O)-R-C(O)-NH-N=CR^1R^2$, wherein R is a member selected from the group consisting of a divalent alkylene group and an alicyclic group having from 0 to 34 carbon atoms and a divalent aromatic ring and $R^1$ and $R^2$ are selected from the group consisting of H and ($C_1$-$C_6$) alkyl and alicyclic groups.

8. The composition of claim 4 wherein the curing agent comprising a member selected from the group consisting of a dicarboxylic acid bis-hydrazide represented by the formula, $H_2N-NH-C(O)-R-C(O)-NH-NH_2$, and a dicarboxylic acid bis-hydrazone represented by the formula $R^1R^2C=N-NH-C(O)-R-C(O)-NH-N=CR^1R^2$, wherein R is a member selected from the group consisting of a divalent alkylene group and an alicyclic group having from 0 to 34 carbon atoms and a divalent aromatic ring and $R^1$ and $R^2$ are selected from the group consisting of H and ($C_1$-$C_6$) alkyl and alicyclic groups.

9. The composition of claim 8 wherein the curing agent comprises a member selected from the group consisting of a dicarboxylic acid bis-hydrazide represented by the formula, $H_2N-NH-C(O)-R-C(O)-NH-NH_2$, and a dicarboxylic acid bis-hydrazone represented by the formula $R^1R^2C=N-NH-C(O)-R-C(O)-NH-N=CR^1R^2$, wherein R is a divalent polymethylene group having from 0 to 7 carbon atoms and $R^1$ and $R^2$ are selected from the group consisting of H and ($C_1$-$C_6$) alkyl and alicyclic groups.

10. The composition of claim 5 wherein the curing agent comprises a member selected from the group consisting of oligomers comprising units from ($C_1$-$C_4$) alkyl esters of acrylic acid and methacrylic acid containing a plurality of pendant hydrazide or hydrazone groups and dicarboxylic acid bis-hydrazones represented by the formula $R^1R^2C=N-NH-C(O)-R-C(O)-NH-N=CR^1R^2$ wherein $R^1$ and $R^2$ are selected from the group consisting of H and ($C_1$-$C_6$) alkyl and alicyclic groups.

11. The composition of claim 10 wherein the curing agent comprises a member selected from the group consisting of oligomers comprising units from ($C_1$-$C_4$) alkyl esters of acrylic acid and methacrylic acid containing a plurality of pendant hydrazide or hydrazone groups.

12. A crosslinked coating carried on a rigid substrate obtained by the ambient or low-temperature curing of the composition of claim 1.

13. A crosslinked coating carried on a rigid substrate obtained by the ambient or low-temperature curing of the composition of claim 6.

14. A crosslinked coating composition carried on a rigid substrate obtained by the ambient or low-temperature curing of the composition of claim 7.

15. A crosslinked coating carried on a rigid substrate obtained by the ambient or low-temperature curing of the composition of claim 10.

16. An article of manufacture comprising a rigid substrate coated with the ambient or low-temperature cured composition of claim 1.

17. An article of manufacture comprising a rigid substrate coated with the ambient or low-temperature cured composition of claim 6.

18. An article of manufacture comprising a rigid substrate coated with the ambient or low-temperature cured composition of claim 7.

19. An article of manufacture comprising a rigid substrate coated with the ambient or low-temperature cured composition of claim 10.

* * * * *

UNITED STATES PATENT AND TRADEMARK OFFICE
CERTIFICATE OF CORRECTION

PATENT NO. : 4,210,565

Page 1 of 2

DATED : July 1, 1980

INVENTOR(S) : WILLIAM D. EMMONS

It is certified that error appears in the above-identified patent and that said Letters Patent are hereby corrected as shown below:

On Title Page, after "Attorney, Agent or Firm", delete "Robert J. Steinmeyer; John E. Vanderburgh".

Col. 3, line 22, change "15 parts of 50 parts" to --15 parts to 50 parts--.

Col. 7, line 53, change "Nov. 22, 1977" to --Dec. 20, 1977--.

Col. 18, line 33, before "substrates" insert --Penopac--.

Col. 19, line 7, delete "*" following "1500".

Col. 20, line 6 of footnotes below Table VI, insert superscript --6-- before "Butyl".

UNITED STATES PATENT AND TRADEMARK OFFICE
CERTIFICATE OF CORRECTION

PATENT NO. : 4,210,565

DATED : July 1, 1980

INVENTOR(S) : WILLIAM D. EMMONS

It is certified that error appears in the above-identified patent and that said Letters Patent are hereby corrected as shown below:

Col. 22, line 13, insert --,-- between "clear" and "sl." in "Appearance" column.

Col. 22, line 27, change "." to --,-- in "Appearance" column.

Cols. 23-24, line 12, (line 4 of Table IX), change "Solvent Resistance$^6$" to --Solvent Resistance$^2$--

Col. 23, line 40, change "vinyl ether" to --vinyl ethers--.

Signed and Sealed this

Sixth Day of January 1981

[SEAL]

Attest:

SIDNEY A. DIAMOND

Attesting Officer

Commissioner of Patents and Trademarks